G. C. JENSEN.
LOCK MECHANISM FOR MOTOR VEHICLES.
APPLICATION FILED SEPT. 10, 1917.
1,251,782.
Patented Jan. 1, 1918.
2 SHEETS—SHEET 1.
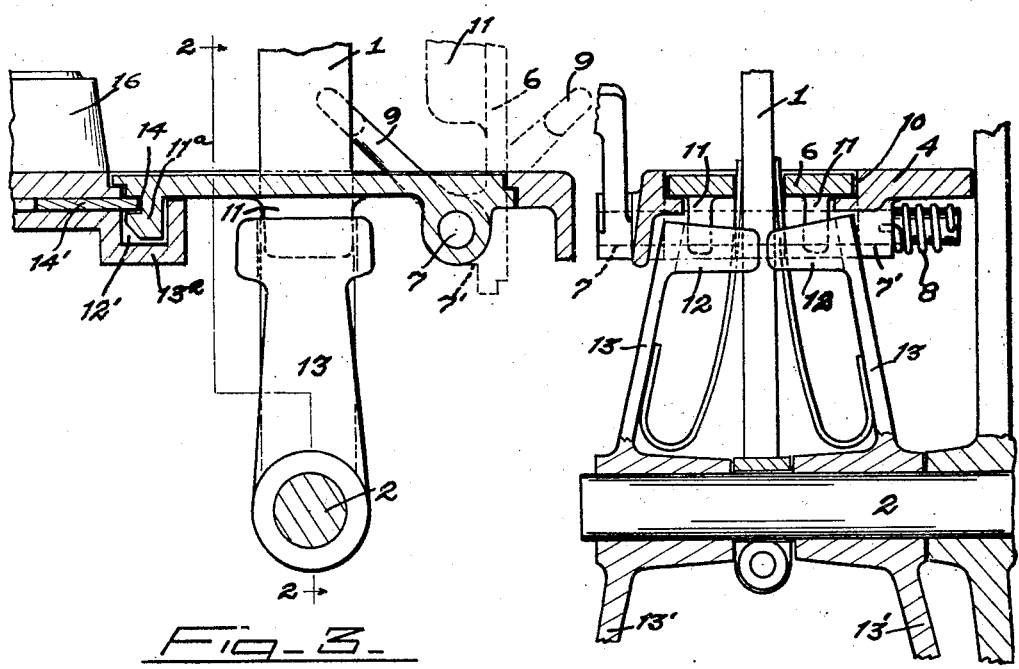
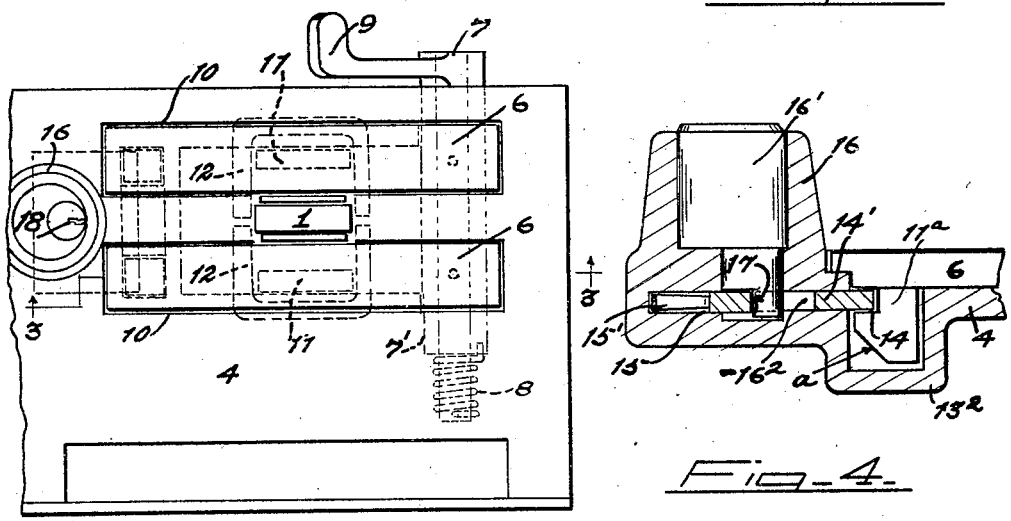
WITNESS:
Wm F. Drew
INVENTOR.
George C. Jensen
BY
Acker & Tollen
ATTORNEYS.

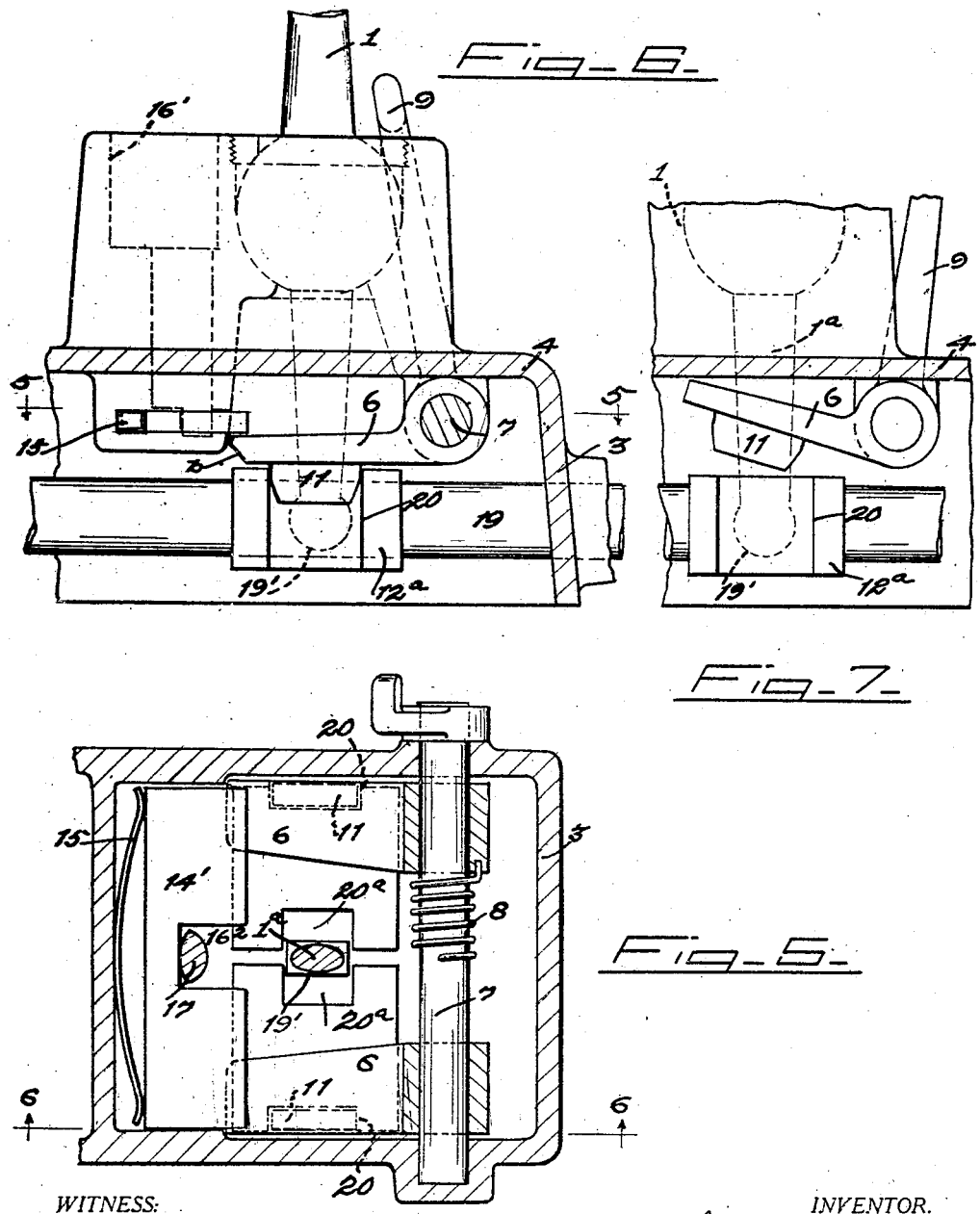

UNITED STATES PATENT OFFICE.

GEORGE C. JENSEN, OF OAKLAND, CALIFORNIA.

LOCK MECHANISM FOR MOTOR-VEHICLES.

1,251,782.   Specification of Letters Patent.   Patented Jan. 1, 1918.

Application filed September 10, 1917. Serial No. 190,548.

*To all whom it may concern:*

Be it known that I, GEORGE C. JENSEN, a citizen of the United States, residing at Oakland, in the county of Alameda and State of California, have invented certain new and useful Improvements in Lock Mechanism for Motor-Vehicles, of which the following is a specification.

The hereinafter described invention is designed for preventing the operative throwing of the gear shift lever for shifting the variable speed gears of motor driven vehicles at such times as the vehicle is left standing during the absence of the operator thereof, and by so doing preventing the movement of the vehicle under its own power; the invention residing in foot or hand actuated means capable of being thrown so as to move into engagement with the shift blocks which actuate the gear shift and by so doing preventing the gear shift lever from being thrown into engagement with said shift blocks for varying the position thereof to throw or shift the variable speed gears.

The object of the invention is to provide means under the control of the operator of the machine through the medium of the hand or foot for moving into engagement with the shift blocks, which when moved into such engagement will prevent the gear shift lever engaging the same for operative movement thereof for the shifting of the variable speed gears of the motor vehicle, and which said means when moved into engagement with the shift blocks is automatically locked in said position and prevented from being disengaged until the operator of the machine deliberately releases the lock mechanism.

The invention broadly comprises means under the control of the operator for locking the gear shift lever against operative movement for the shifting of the variable speed gears, by being moved into locked engagement with the shift blocks which control the movement of the said variable speed gears, and holding the said shift blocks against movement by the action of the gear shift lever until the lock mechanism has been released to permit the shift block engaging means being thrown from locked engagement therewith, so that the gear shift lever may be free to actuate the said shift blocks to move the same for shifting the variable speed gears.

Under the present invention it is permissible to freely throw the shift lever where the same is mounted for universal movement, without such movement actuating the shift blocks for and shifting the variable speed gears, thus providing against injury to the shift lever by one's desiring to actuate the vehicle under its own power where the shift blocks have been locked against movement.

For an understanding of the invention, reference should be had to the accompanying sheets of drawings, wherein—

Figure 1 is a top plan view disclosing the base plate through which the shift lever works, and illustrating the improved locking means as applied thereto and in locked engagement with the shift blocks.

Fig. 2 is a cross sectional view in elevation, taken on line 2—2, Fig. 3 of the drawings, and viewed in the direction of the arrows.

Fig. 3 is a longitudinal sectional side elevation taken on line 3—3, Fig. 1 of the drawings, the locking arm being illustrated by dotted lines in raised position.

Fig. 4 is a detail sectional view of the lock mechanism.

Fig. 5 is a horizontal sectional plan view taken on line 5—5, Fig. 6, viewed in the direction of the arrows.

Fig. 6 is a sectional side elevation taken on line 6—6, Fig. 5 of the drawings, illustrating the invention as applied for the locking of the shift blocks used in connection with the universal type of shift lever, said view disclosing the locking arms in engagement with the shift block.

Fig. 7 is a broken detail sectional elevation illustrating the locking arms in raised position or out of engagement with the shift block.

In the drawings, reference being had more particularly to Figs. 1, 2, 3 and 4 thereof, the numeral 1 is used to designate a shift lever of the type commonly employed on motor vehicles, the upper end portion of the said shift lever being broken away. This lever is arranged for swinging movement in two parallel planes and for this purpose is freely fulcrumed upon a horizontal shaft 2, which said shaft is mounted in suitable bearings of the housing or frame, and which frame or housing supports the shift lever floor or base plate 4. This floor or base plate is formed with the usual H- slot for permitting the lateral throw of the shift lever 1 from neutral position to move into engagement with either of the shift blocks 12, when it is desired to shift the variable speed gears of the motor vehicle.

To the floor plate 4, and at a point beneath the same, is mounted for vertical swinging movement, the arms 6, which arms are secured to a spring held rotatable shaft 7 mounted in bearings carried by the underside of the floor plate 4, and which shaft is normally held to hold the arms 6 in raised position by means of the torsion of the spring 8 coiled thereon, and secured at one end to the said shaft 7, and at its opposite end to one of the fixed bearings 7' depending from the underside of the plate 4. To the outer or projecting end of the oscillating or rock shaft 7 is attached a foot lever or pedal 9. The arms 6 work within the slotted portions 10 of the floor or base plate 4, and when in lowered position the upper surface thereof is flush with the upper surface of the said floor or base plate 4. Each of the said arms 6, intermediate of its end, carry a downwardly projecting lug extension 11, which extensions, when the arms 6 are thrown into lowered position, fit within the shift blocks 12 carried at the upper extremity of the gear levers 13, which levers are fulcrumed on the shaft 2, the lower extensions 13' of each fulcrum lever being connected with the usual shift rods, not shown in the drawings, and which said rods serve to shift the variable speed gears of the motor vehicle in accordance with the throw of the shift lever 1 when moved into engagement with the shift blocks 12.

Each arm 6, at its outer end, is provided with a downwardly extended tapered lug 11$^a$, which when the arms 6 are thrown into lowered position move and fit within a seat 12' of the U-shaped bracket 13$^2$ carried by the underface of the floor or base plate 4 (Figs. 2 and 4 of the drawings). Each of the lugs 11$^a$ is formed with a cut-out or socket portion 14, which receive the lock bolt 14' movable horizontally within the guide slot 15 in the foot or base plate 4, the said lock bolt or plate 14' being held normally outwardly pressed by means of the spring 15' seated within the guide slot 15, and which exerts pressure on the inner face of the said lock bolt or plate 14'.

The outer face of each of the lugs 11$^a$ is inclined or beveled as shown at $a$ Fig. 4 of the drawings, so that as the arms 6 are thrown downwardly through pressure applied on the foot lever 9 which actuates the shaft 7 to throw the arms 6, the beveled face $a$ of the lugs 14 will force inwardly the spring held sliding bolt 14', until the arms 6 have reached their lowermost position, when the pressure of the spring 15' will automatically throw the sliding lock bolt 14' within the socket portion 14 of the lugs 11$^a$ and thus automatically lock the arms 6 in their lowered position, Fig. 4 of the drawings. When in this lowered position, the locking lugs 11 are fitted within the shift blocks 12 and fill the said shift blocks, and as a consequence the shift lever 1 cannot be moved into engagement therewith on an attempted throw of the same from neutral position.

With the shift blocks thus filled, the shift lever 1 is held against operative movement for shifting the variable speed gears of the motor vehicle.

Within the barrel housing 16, upwardly projecting from the base or floor plate 4, is mounted a rotatable lock barrel 16', which at its lower end carries a lug 17, which works within a slotted section 16$^2$ of the lock plate 14', the said lug 17, on a turn of the lock barrel 16' through the medium of a key fitted within the key opening 18 thereof, throws or moves rearwardly the lock plate 14' to move the same out of engagement with the lugs 11$^a$ of the arms 6, the arms 6, when the lock bolt 14' is moved out of engagement with the lugs 11$^a$, being free to swing upwardly on pressure being removed from the foot lever or pedal 9, the same at such time being thrown upwardly by the tension of the spring 8, which throws the shaft 7 to raise the arms 6 into the position shown in dotted lines, Fig. 3 of the drawings, and in full lines, Fig. 7 of the drawings, and in which position the locking lugs 11 are moved from engagement with the shift blocks 12, and the same are thus free to be engaged by the shift lever 1 for shifting the variable speed gears of the vehicle through the shifting movement of either of the shift blocks 12 by the throwing of the lever 1 when in engagement therewith.

In Figs. 5, 6 and 7 of the drawings, the lock arms 6 are illustrated as being applied for use in connection with the locking of the shift blocks, designated in said views by the reference numeral 12$^a$, which are actuated by the lower extremity of a shift lever 1$^a$ mounted for universal movement, commonly known as the ball socket shift lever. In this case, the shift blocks 12$^a$ are mounted on slide rods 19, and which shift blocks 12$^a$ are engaged by the lower free end 19' of the shift lever 1$^a$ when the shift blocks 12$^a$ are free to receive the same on the said shift lever 1$^a$ being thrown for operative movement to actuate either of the slide rods 19 for shifting the variable speed gears of the motor vehicle.

Under this construction, the arms 6 work beneath the floor or base plate 4 instead of being mounted for movement above the said plate, as illustrated in Figs. 1, 2 and 3 of the drawings. However, the foot lever or pedal 9 extends above the floor plate 4 and at one side of the housing 3, and when the said lever 9 is thrown to lower the arms 6, the lug extensions 11 thereof move into engagement with the shift blocks 12ª.

In this case and for convenience and to prevent unnecessary crowding of the working parts, the shift blocks 12ª are provided in the outer wall faces thereof with the recesses or socket portion 20, into engagement with which the lugs 11 of the arms 6 move when the said arms are thrown into a lowered position. It is obvious, however, that if so desired the arms 6 may be moved closer together on the shaft 7, so that the lug extensions 11 thereof may move into engagement with the recessed portions 20ª thereof, so as to prevent the shift lever 1ª moving into engagement with such recessed portions 20ª. However, preference is given in providing the shift blocks 12ª with the recessed portions 20, and so spacing the arms 6 relative to the shaft 7 that the lug extensions 11 thereof will engage with the recessed portions 20 of the shift blocks. Under this construction the arms 6 when lowered are in a plane beneath that of the lock bolt 14', and inasmuch as the lug extensions 11ª, illustrated in Figs. 1, 3 and 4 of the drawings, are eliminated from the lock arms 6 of Figs. 5, 6 and 7 of the drawings, the free end of each arm 6 is beveled, as shown at b, so that as the arms 6 are thrown downwardly the beveled face thereof impinges against the outer face of the lock bolt 14' and forces the same inwardly so as to permit the arms 6 to clear the same, the said lock bolt automatically moving outwardly by the pressure of the spring 15 to overlie the arms 6 when in full lowered position, and the arms thus held locked against upward movement until the rotatable lock barrel 16' has been thrown or turned to cause the lug 17 thereof to throw the lock plate 14' to move the same from within the sphere of the arms 6, at which time the arms 6 are free to move upwardly and are thrown upwardly by the tension of the spring 8 on pressure being released from the foot lever or pedal 9.

It is obvious that when the lug extensions 11 of the arms 6 are in engagement with the recessed or socket portions 20 of the shift blocks 12ª, that the said blocks are held against movement of any kind by the action of the universal shift lever 1ª, consequently, although the universal shift lever 1ª is free to be moved in any direction, no such movement can actuate the shift blocks 12ª to shift the variable speed gears of the motor vehicle through a movement of the rods 19, until the arms 6 have been thrown into such a position as to take the lug extensions 11 thereof from within engagement with the shift blocks 12ª.

It will be noted that the action of the lock bolt for the locking of the arms 6 as thrown into lowered position to cause the lug extensions 11 thereof to move into engagement with the shift blocks, is entirely automatic and the said blocks are held against movement of any kind until the operator of the vehicle actuates the lock barrel to operate the lock bolt 14' to release the said arms 6, and it will be further noted that the arms 6 are automatically moved out of engagement with the shift blocks on a release of the lock bolt 14', that the said arms 6 are thrown or lowered for engagement with the shift blocks through the action of the foot or hand controlled lever or pedal 9.

I am aware that various changes may be made in the details of construction of the working parts of the described lock controlled means, without departing from the nature and the spirit of the invention, and I do not wish to be understood as limiting or confining myself to such details of construction, but, on the contrary, wish to be understood as claiming as broadly as the state of the art will permit, pressure actuated locking arms adapted to be thrown into locking position through the action of a foot pedal or lever for movement into locked engagement with the shift blocks controlling the shifting movement of the variable gears, and adapted to be automatically held locked in said adjusted position, and to be automatically moved out of locked engagement with the said shift blocks on a release of the lock bolt from engagement with the said arm.

Having thus described my invention, what I claim as new and desire to protect by Letters Patent is:—

1. In combination with a support having a shift lever mounted therein for free swinging movement, of shift blocks adapted to be engaged by said lever for actuating the same to shift the variable gears of a motor driven vehicle, pivotally mounted spring held arms carrying extensions adapted to be moved into engagement with said shift blocks to hold the same against operative movement, a spring held lock bolt for automatically engaging and holding said arms in engagement with said shift blocks, and lock controlled means for actuating said lock bolt to release the said lock means.

2. In combination with the shift blocks for controlling the shifting of the variable gears of a motor driven vehicle, of pressure actuated block locking means capable of swinging movement for engaging said shift blocks to hold the same against movement, a lock controlled locking bolt within the path of movement of said locking means for engaging and holding the block locking means in locked engagement with said blocks, and means for moving the locking means out of engagement with the shift blocks and restoring the same to normal position on a release of the lock controlled lock bolt from engagement with said block-locking means.

3. In combination with the shift blocks for controlling the shifting of the variable gears of a motor driven vehicle, of pivotally mounted spring held swinging means for engaging said blocks and holding the same locked against movement, foot actuated means for throwing said swinging means into engagement with the shift blocks, and a lock controlled lock-bolt within the path of movement of the free end of said swinging means for automatically engaging and holding said swinging means in locked engagement with the shift blocks.

4. In combination with the shift blocks for controlling the shifting of the variable gears of a motor driven vehicle, of a spring held rock shaft, foot controlled means for throwing said shaft in one direction, arms carried by said shaft provided with extensions for engaging with the shift blocks to hold the same locked against movement on the arms being moved in one direction, a spring held slide lock bolt for holding the said arms in locked engagement with the shift blocks, and lock controlled means for actuating said lock bolt to release the lock arms and permit the return thereof to a normal position.

5. The combination with the shift blocks for controlling the shifting of the variable gears of a motor driven vehicle, of spring held foot actuated pivotally mounted means adapted to be swung into locked engagement with said blocks to hold same against movement, an automatically controlled lock bolt within the path of movement of the free end of said foot actuated means for engaging and holding the same in locked engagement with the said shift blocks, and mechanism for withdrawing said bolt from engagement with the free end of said foot actuated means to permit the said means to move out of engagement with the shift blocks.

In testimony whereof I have signed my name to this specification in the presence of the subscribing witness.

GEORGE C. JENSEN.

Witness:
D. B. RICHARDS.